(12) United States Patent
Moscovici et al.

(10) Patent No.: US 6,678,765 B1
(45) Date of Patent: Jan. 13, 2004

(54) EMBEDDED MODEM

(75) Inventors: Avishay Moscovici, Tel Aviv (IL); Aviram Hertzberg, Kochav-Yair (IL); Yehuda Rudin, Netanya (IL)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/498,862

(22) Filed: Feb. 7, 2000

(51) Int. Cl.[7] ............................................... G06F 13/12
(52) U.S. Cl. ............................. 710/72; 710/29; 710/35; 712/35; 375/222
(58) Field of Search ........................ 710/22–29, 33–35, 710/52–63, 72; 712/35; 375/220, 222, 354; 709/220

(56) References Cited

U.S. PATENT DOCUMENTS

| | | | | |
|---|---|---|---|---|
| 5,170,470 A | | 12/1992 | Pindar et al. ................ | 395/275 |
| 5,355,507 A | | 10/1994 | Nishikawa ................... | 395/800 |
| 5,625,828 A | | 4/1997 | Carmon et al. ............. | 395/800 |
| 5,630,153 A | * | 5/1997 | Intrater et al. ................ | 712/35 |
| 5,737,397 A | | 4/1998 | Skinner et al. ........... | 379/93.29 |
| 6,014,722 A | * | 1/2000 | Rudin et al. ................. | 710/240 |
| 6,021,167 A | * | 2/2000 | Wu ............................. | 375/354 |
| 6,047,337 A | * | 4/2000 | Smith .......................... | 710/23 |
| 6,327,648 B1 | * | 12/2001 | Hedayat et al. ............... | 712/35 |
| 6,351,781 B1 | * | 2/2002 | Gracias et al. ................ | 710/22 |
| 6,374,312 B1 | * | 4/2002 | Pearce et al. ................. | 710/23 |

* cited by examiner

Primary Examiner—Christopher B Shin

(57) ABSTRACT

An embedded system that has a general purpose central processing unit CPU and a digital signal processor DSP, the CPU is adapted to perform various tasks such as code consuming tasks associated to the transmission and reception of information and the DSP is adapted to perform tasks that require less program code and that are associated to the transmission and reception of information. Most of the time the CPU can handle tasks that are not related to the transmission and reception of data.

26 Claims, 4 Drawing Sheets

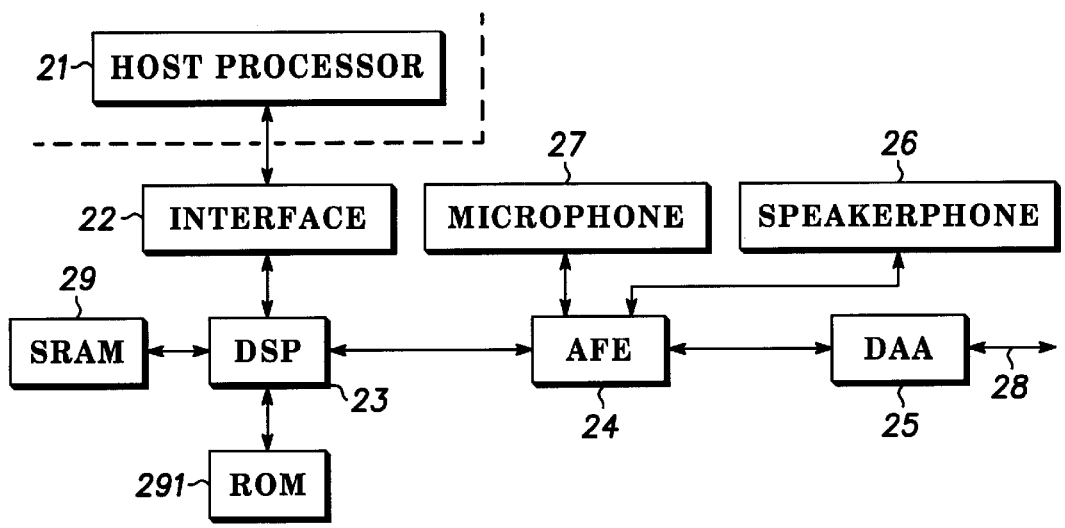
FIG. 1 - PRIOR ART -
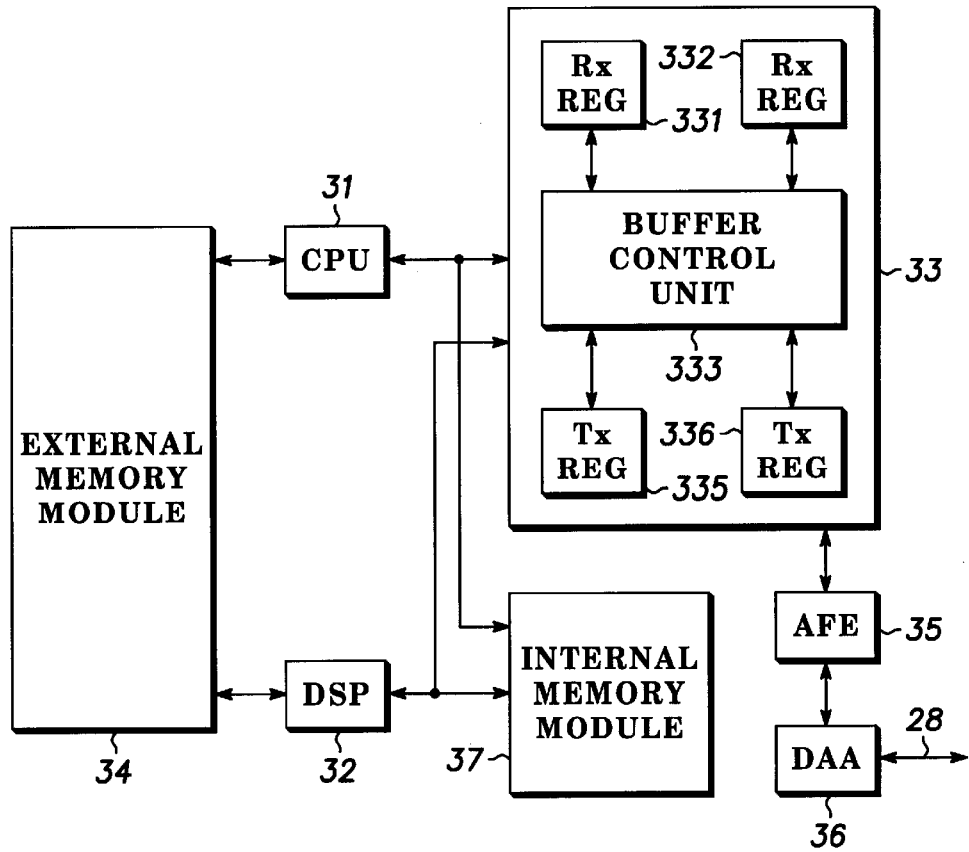
FIG. 2

EMBEDDED MODEM

FIELD OF THE INVENTION

An embedded modem and especially an embedded modem having two processors, a general purpose processor that is adapted to execute lengthy programs and a digital signal processor adapted to execute concise programs. The digital signal processor is adapted to execute digital processing tasks while the general purpose processor is adapted to execute control and digital processing tasks.

BACKGROUND OF THE INVENTION

Modems enable information to be transferred over telephone lines or other communication links. Information is exchanged between a call modem and an answer modem after both modems perform a handshake process. During the handshake process various parts of the modem are configured and various parameters that effect the transmission of data over the communication link are set. Various ITU-T recommendations, such as V.90, V.32, V.22bis, V.34, V.32bis and V.8 define the signals that are sent from one modem to the other and the manner in which these signals are processed.

Some recommendations, such as V.34 and V.90 of ITU-T, define a four-phased handshaking process. Phase 1 is also known as the network interaction phase. During phase 1 the modems exchange signals such as answer tones ANS and ANSam, CI, CJ, CM, JM. These signals allow the modems to determine some negotiation parameters such as which recommendations are supported by the modems and which modulation modes are available. Phase 2 is also known as the probing/ranging phase in which the modems estimate a round trip delay and decide on a symbol rate, carrier frequency, which pre-emphasis filter out of a plurality of filters to select, and set a power level. During phase 2 the modems exchange signals such as A, A~, B, B~, L1, L2 and INFO0c. Tone A has a first frequency, such as 2400 Hz and tone A~ is obtained by a 180 degree reversal of tone A. Tone B has a second frequency, such as 1200 Hz and tone B~ is obtained by a 180 degree reversal of tone B. Signals L1 and L2 are used to analyze the characteristics of the telephone channel. Phase 3 is also known as the equalizer and echo canceller training phase. During phase 3 the modems exchange signals such as S, MD, PP, TRN, J, Ŝ, and use the estimated round trip delay and negotiation parameters such as the symbol rate to train their equalizers and echo canceling filters. Phase 4 is also known as the final training phase. During phase 4 the modems exchange signals such as S, Ŝ, TRN, J, J', MP, MP', E and B1 and end the training period. During each of the four phases the modems are adapted to perform error-free procedures and recovery procedures. During the handshake phases different modulations and different modem blocks are used.

After phase 4 ends the modems exchange information. Data is transmitted by a transmitter portion of the modem and received by a receiver portion of the modem. These portions are relatively complex. Generally speaking, the transmitter portion receives a digital bit stream, processes the bit stream and provides modulated analog signals, the receiver portion receives modulated analog signals, demodulates the signals and provides decoded digital signals. For example, a transmitting section of a V.32 compatible modem comprises of a scrambler, a differential encoder, a convolutional encoder, a signal mapping unit, pulse shaping filters, a phase modulation modulator, a digital to analog converter, and a low pass filter. A transmitting section of a V.34 compatible modem comprises of a scrambler, a data parsing unit, a shall mapper, a differential encoder, a MAP unit, a trellis encoder, a precoder, a non-linear encoder, and a QAM modulator.

A receiver section of a V.34 compatible modem comprises of a demodulator and a decoder, the demodulator further comprises of an echo canceller, a demodulator block and an adaptive equalizer. The decoder further comprises of a Viterbi decoder, an inverse precoder and an inverse mapper. The adaptive equalizer and the echo canceller further comprise of a finite impulse response filter, an LMS block and an error calculation block. The adaptive equalizer and the echo canceller are trained during phases 3 and 4 of the handshaking process.

Referring to FIG. 1, many prior art modems 20 are coupled to a host processor 21, such as a general purpose central processing unit (i.e.—CPU) via an I/O interface 22. Such a modem usually comprises of the I/O interface 22; a digital signal processor (i.e.—DSP) 23, for handling signal processing functions; an analog front end (i.e.—AFE) 24 for coupling the DSP to a data access arrangement circuit (i.e.—DAA) 25, to an optional speakerphone 26 and a microphone 27; DAA 25, for interfacing the mentioned above elements to a communication link 28 such as a telephone line; and memory module such as a ROM 291 and a SRAM 29 memory modules for storing information, data tables and program code. DSP 23 is used to implement various parts of the transmitter portion and the receiver portion of the modem.

DSP 32, under the control of a modem control program, handles the handshaking process and data transmission. The modem control program, and especially portions of the modem control program that handle phases 1 and 2 of the handshaking process (i.e.—phase 1 and phase 2 control programs) are very long. Due to the length of the modem control program it is stored in an external memory module, or in an expensive internal memory module. A disadvantage of the former solution is that the execution of the program is time consuming and a disadvantage of the latter solution is its relatively high cost. DSP are usually well suited to handle digital signal processing tasks and do not handle in such an effective manner control tasks, such as various tasks that are executed during the handshaking process. A disadvantage of both solutions is that in order to handle the handshaking process and a data mode the DSP has to be driven by a vary fast clock and be able to handle many millions instruction per second.

There is a need to provide an improved modem that allows a relatively cost effective and fast modem.

BRIEF DESCRIPTION OF THE DRAWINGS

While the invention is pointed out with particularity in the appended claims, other features of the invention are disclosed by the following detailed description taken in conjunction with the accompanying drawings, in which:

FIG. 1 is a schematic description of a prior art modem;

FIG. 2 is a schematic description of a system according to a preferred embodiment of the invention;

DETAILED DESCRIPTION OF THE DRAWINGS

Figure 3:
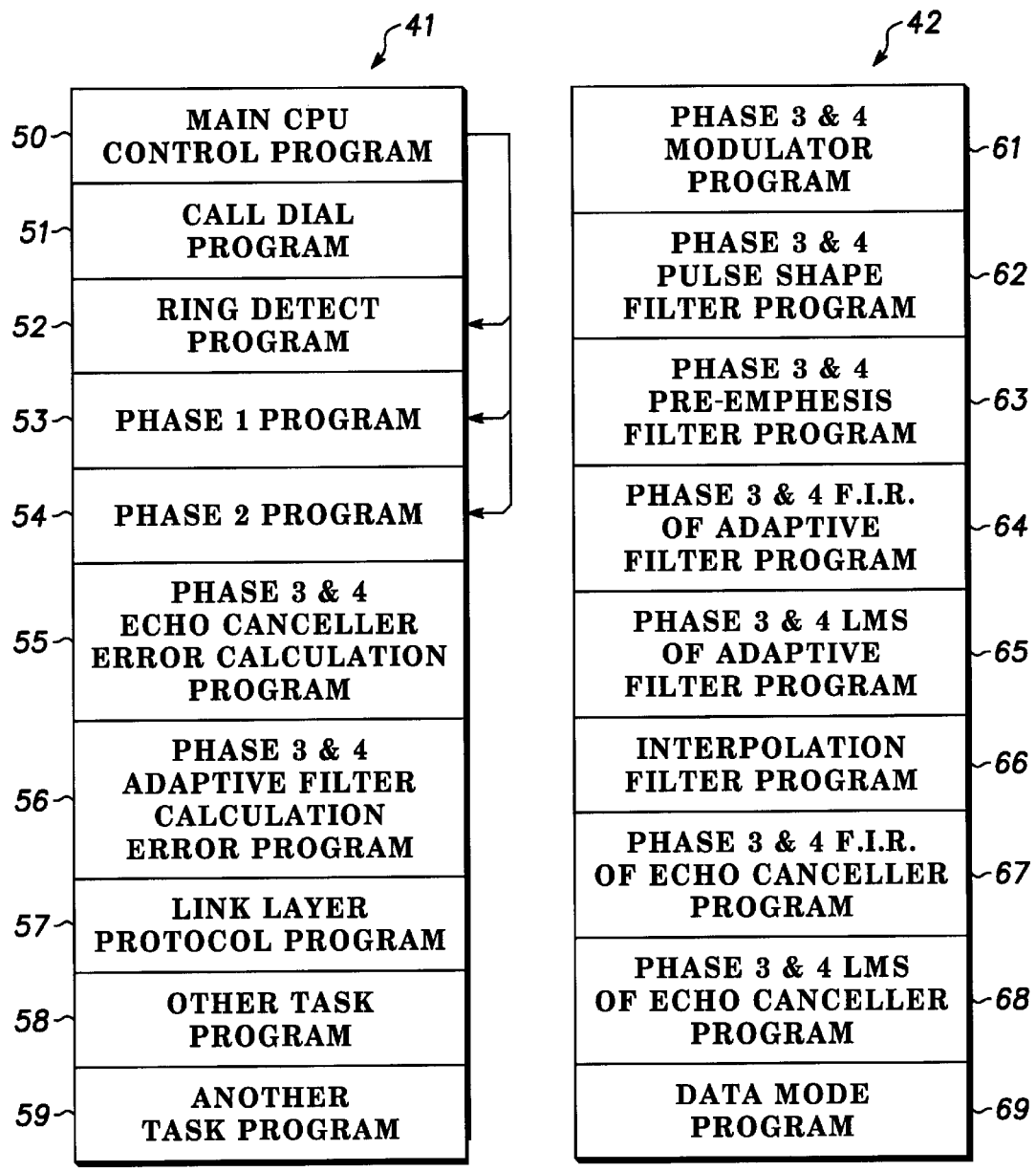
FIG. 3 is a schematic description of two memory portions of at least one memory module, according to a preferred embodiment of the invention.

It should be noted that the particular terms and expressions employed and the particular structural and operational details disclosed in the detailed description and accompanying drawings are for illustrative purposes only and are not intended to in any way limit the scope of the invention as described in the appended claims.

The present invention provides an embedded system that has a general purpose central processing unit CPU and a digital signal processor DSP, the CPU is adapted to perform various tasks such as code consuming tasks associated to the transmission and reception of information and the DSP is adapted to perform tasks that require less program code and that are associated to the transmission and reception of information. The DSP handles digital signal processing tasks and CPU handles mainly control tasks. During most of the time the CPU can handle tasks that are not related to the transmission and reception of data, such as browsing or controlling a screen of a mobile phone/browser. Furthermore, the DSP that does not have to execute lengthy programs in relatively very short periods can be driven by a slower clock.

Conveniently, the present invention provides a system that has a CPU and a DSP, the CPU is adapted to handle phases 1 and 2 of a modem handshaking process and a part of phases 3 and 4 of the handshaking process while the DSP is adapted to handle another part of phases 3 and 4 of the handshaking process and the exchange of information that follows a successful handshaking process. For convenience of explanation, the term 'data mode' is used to describe the embedded modem mode of operation when information is exchanged after a successful handshake process ended.

A memory module stores a CPU control programs such as an operating system that enables the CPU to perform various tasks, the CPU programs comprise of dial call progress program, ring detector program, phase 1 handshaking program, phase 2 handshaking program, phase 3 and 4 echo canceller error calculation program, phase 3 and 4 adaptive filter error calculation program and a link layer protocol program. A memory module stores a plurality of DSP programs that enable the DSP to perform various tasks, the DSP programs comprise of a phase 3 and phase 4 modulator program, a phase 3 and phase 4 pulse shape filter program, a phase 3 and phase 4 pre-emphasis filter program, a phase 3 and phase 4 finite impulse response filter of an adaptive filter program, a phase 3 and phase 4 LMS block of the adaptive filter program, a phase 3 and phase 4 finite impulse response filter of an echo canceller program, a phase 3 and phase 4 LMS block of the echo canceller program, and data mode program.

Conveniently, the CPU configures the DSP by sending it a set of instructions that define a set or a sequence of DSP programs to be executed by the DSP.

Referring to FIG. 2, embedded modem 30 comprising of CPU 31, DSP 32, internal memory module 37, buffer means 33, AFE 35, DAA 36 and external memory module 34. Buffer means 33 comprises of a buffer control unit 333, at least two receive registers 331 and 332 and at least two transmit registers 335 and 336. Buffer means 33 allows signals to be both received from AFE 35 and transmitted to AFE 35 simultaneously. Receive registers 331 and 332 allow CPU 31 and DSP 32 to process data that is written in a receive register while the other receive register is used to receive data from AFE 35. Transmit registers 335 and 336 allow CPU 31 and DSP 32 to process data to be sent to AFE 35, while the other transmit register is used to transmit data to AFE 35.

Buffer control unit 333 is coupled to buffers 331, 332, 335 and 336, DSP 32 and CPU 31. Buffer control unit 333 determines which receive buffer out of 331 and 332 is to be coupled to AFE 35, and which is to be accessed by either DSP 32 or CPU 31. Buffer control unit 333 determines which transmit buffer out of 335 and 336 is to be coupled to AFE 35, and which is to be accessed by either DSP 32 or CPU 31. Buffer control unit 333 senses when a receive register is full or a transmit register is empty, and accordingly sends either CPU 31 or DSP 32 an interrupt request. Usually, if data is received in a receive register while DSP 32 operates in a data mode the requests are sent to DSP 32, if data is to be transmitted from a transmit register, the request is sent to CPU 31.

Conveniently, during data mode, CPU 31 performs data layer protocol processing upon data. Therefore, data that is about to be transmitted is first processed by CPU 31 and then processed by DSP 32. Data that is received is first processed by DSP 32 and than by CPU 31. CPU 31 or DSP 32 respond to the interrupt request by reading the status of buffer means 33 and accordingly either processing data that is stored in a receive register or processing data and storing the processed data in a transmit register. The status of buffer means 33 can be stored in buffer control unit 33. Embedded modem 30 can have another buffer (not shown) that can store multiple data packets, so that CPU 31 and DSP 32 can access the other buffer and process multiple data packets.

Referring to FIG. 3, first portion 41 of external memory module 34 stores CPU programs such as main CPU control program 50, dial call progress program 51, ring detector program 52, phase 1 handshaking program 52, phase 2 handshaking program 54, phase 3 and 4 echo canceller error calculation program 55, phase 3 and 4 adaptive filter error calculation program 56 and a link layer protocol program 57, other task program 58 and another task program 59. CPU executes main CPU control program 50, whereas this execution involves jumping to various programs such as CPU programs 51-59. Other task program 58 and another task program 59 are used to perform tasks that are not related to the embedded modem. There programs can be used to browse the internet.

Second portion 42 of internal memory module 37 stores DSP programs such as phase 3 and phase 4 modulator program 61, phase 3 and phase 4 pulse shape filter program 62, phase 3 and phase 4 pre-emphasis filter program 63, phase 3 and phase 4 finite impulse response filter of an adaptive filter program 64, a phase 3 and phase 4 LMS block of the adaptive filter program 65, interpulation filters program 66, phase 3 and phase 4 finite impulse response filter of an echo canceller program 67, phase 3 and phase 4 LMS block of the echo canceller program 68, and data mode program 68. Each of DSP programs 61–69 can be a subroutine or a function. Conveniently, internal memory module 37 comprises of an internal ROM memory module and an internal RAM memory module. Usually, most of the DSP programs and several CPU programs are stored in the ROM memory module.

External memory module 34 has instruction buffer 71 in which CPU 31 writes a set of instructions that indicate which DSP programs are to be executed by DSP 32. CPU 31 notifies DSP 32 that a set of instructions was written to instruction buffer 71, DSP 32 fetches the set from external memory 34, reads the set of instructions, executes the DSP programs referenced by the instructions and informs CPU 31 that it finished to execute them.

Figure 4:
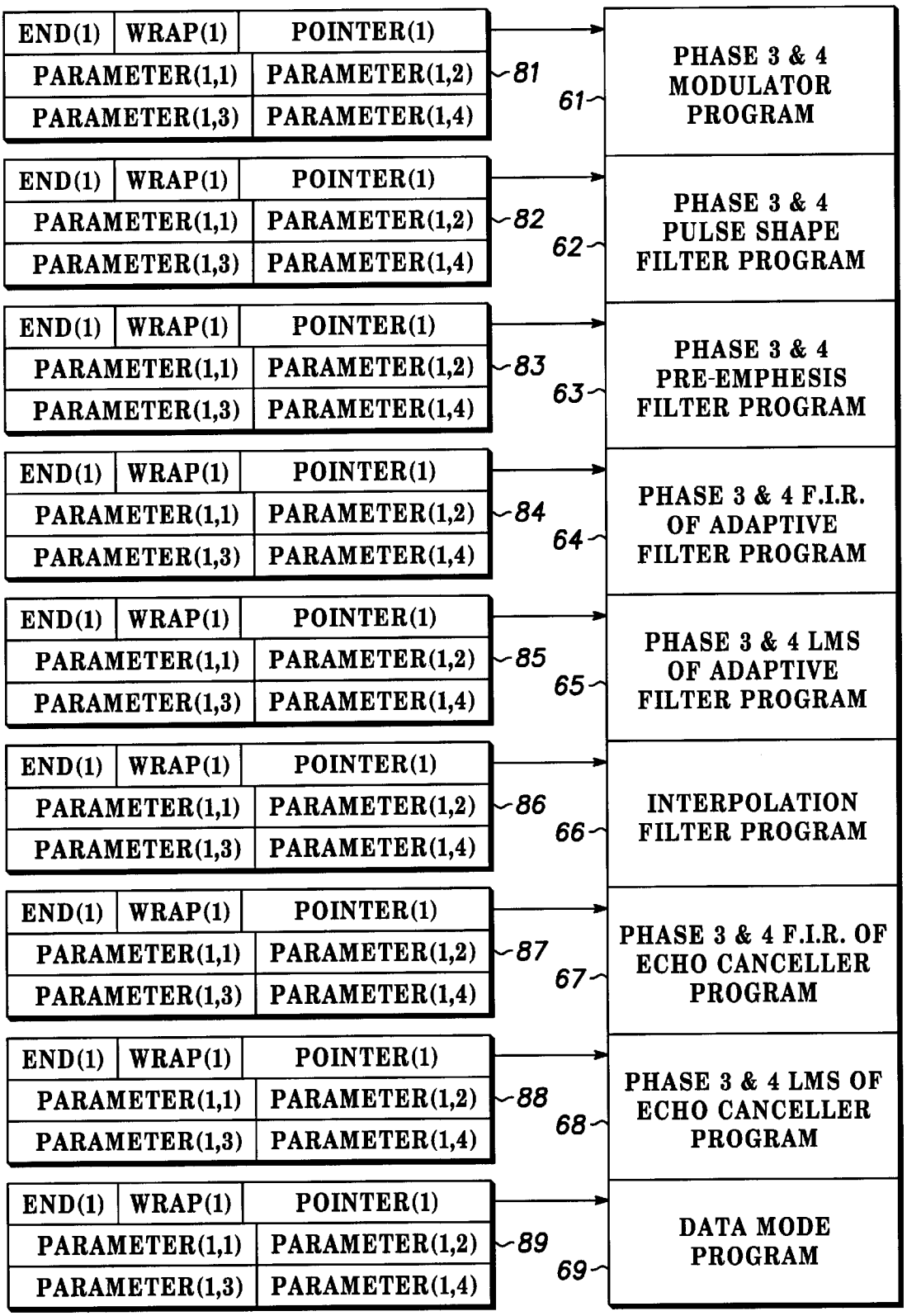
FIG. 4 is a schematic description of a plurality of function descriptors having pointers that point to a plurality of DSP programs, according to a preferred embodiment of the invention.

Referring to FIG. 4, the set of instructions are written in a format of function descriptors. Each function descriptor FD(j) comprises of an END(j) field, indicating whether the function descriptor is the last function descriptor in a sequence of function descriptors; an WRAP(j) field, that is used to form a circular queue of function descriptors, preferably this field stores a number of times that a sequence of instructions are to be executed; a plurality of PARAMETER(j,k) fields, used to store parameters such as negotiation parameters, and a POINTER(j) field, that stores a location in internal memory module 34 of a DSP program P(j) to be executed by DSP 32.

Figure 5:
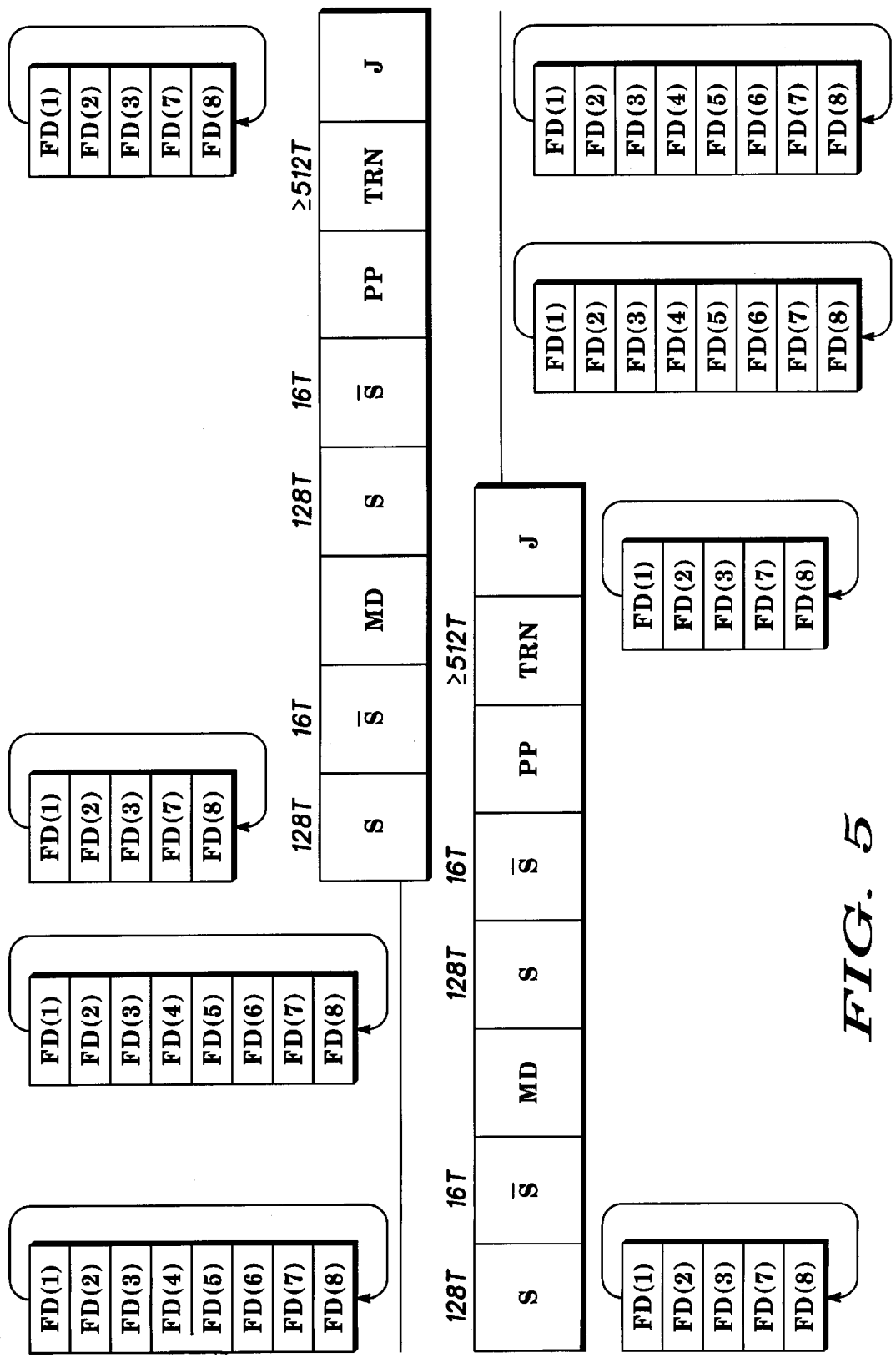
FIG. 5 is an exemplary time diagram illustrating various events that occur during phase 3 of the V.34 handshake process in two modems—a call modem and an answer modem, each of the two modem is implemented according to a preferred embodiment of the invention.

FIG. 5 is an exemplary time diagram illustrates various events that occur during phase 3 of the V.34 handshake process in two modems—a call modem and an answer modem, each analogues to embedded modem 30.

During event 113 the answer modem, under the control of a CPU control program, sends a sequence of signals S, Ŝ MD, PP, TRN and J. Before event 113 starts, the CPU of the answer modem writes to the instruction buffer of the answer modem the following set of function descriptors: FD(1), FD(2), FD(3), FD(7), FD(8). END(8) is set, indicating that FD(8) is the last function descriptor to be fetched by the DSP. During event 113, the DSP of the answer modem reads the function descriptors and executes the following instructions, as illustrated by events 105 and 106: phase 3 and phase 4 modulator program 61; phase 3 and phase 4 pulse shape filter program 62; phase 3 and phase 4 pre-emphasis filter program 63; phase 4 finite impulse response filter of an echo canceller program 67 and phase 3 and phase 4 LMS block of the echo canceller program 68.

After event 113 ends, event 114 starts. During event 114 the answer modem receives signals from the call modem. Before event 114 starts, the CPU of the answer modem writes to the instruction buffer of the answer modem the following set of function descriptors: FD(1), FD(2), FD(3), FD(4), FD(5), FD(6), FD(7) and FD(8). FD(1)–FD(8) have pointers POINTER(1)–POINTER(8). POINTER(1) points to phase 3 and phase 4 modulator program 61, POINTER(2) points to phase 3 and phase 4 pulse shape filter program 62. POINTER(3) points to phase 3 and phase 4 pre-emphasis filter program 63. POINTER(4) points to phase 3 and phase 4 finite impulse response filter of an adaptive filter program 64. POINTER(5) points to phase 3 and phase 4 LMS block of the adaptive filter program 65. POINTER(6) points to phase 3 and phase 4 interpolation filter program 66. POINTER(7) points to phase 3 and phase 4 finite impulse response filter of an echo canceller program 67. POINTER (8) points to phase 3 and phase 4 LMS block of the echo canceller program 68.

During event 114, the DSP of the answer modem reads the function descriptors and executes the following instructions, as illustrated by events 107 and 108: phase 3 and phase 4 modulator program 61; phase 3 and phase 4 pulse shape filter program 62; phase 3 and phase 4 pre-emphasis filter program 63; phase 3 and phase 4 finite impulse response filter of an adaptive filter program 64; phase 3 and phase 4 LMS block of the adaptive filter program 65; phase 3 and phase 4 interpolation filter program 66; and phase 3 and phase 4 finite impulse response filter of an echo canceller program 67 and phase 3 and phase 4 LMS block of the echo canceller program 68.

Conveniently, whenever DSP 32 finishes to execute a set of instructions it notified CPU 31, CPU 31 usually sends in return a "START" signal indicating that the DSP should read instruction buffer 71. During the execution of a previous set of instructions by DSP 32, CPU 31 can update the content of instruction register 71. END(8) of FD(8) is set, indicating that DSP 32 has to fetch the function descriptors from the start of instruction buffer 71 until FD(8). CPM 32 fetches these function descriptors and starts to execute programs P(j) that are referenced by POINTER(j) fields within these function descriptors. After all the programs are executed, DSP 32 sends CPU 31 an END signal, indicating that it ended to execute these programs. CPU 31 can decide whether to send another set of programs to instruction buffer 71, to order DSP 32 to execute the seven instructions again or to be idle. Preferably, during phase 3 and 4 DSP 32 fetches a set of instructions from instruction buffer 71 each period T. Event 113 starts by sending signal S for a period of 128*T, so that during the transmission of signal S CPU 32 fetches a set of instructions 128 times.

While event 113 occurs, and as indicated by line 111, the call modem received the signals transmitted from the answer modem. During event 111, the instruction buffer of the call modem stores FD(1)–FD(8), and accordingly the DSP of the call modem performs programs 61–68 in a periodic manner, as illustrated by events 103 and 104. After event 111 lends event 114 starts, the call modem starts to transmit a sequence of signals, the instruction buffer of the call modem stores FD(1), FD(2), FD(3), FD(7) and FD(8). Accordingly, the DSP of the call modem executes programs 61, 62, 63, 67 and 68 in a periodical manner.

It should be noted that the particular terms and expressions employed and the particular structural and operational details disclosed in the detailed description and accompanying drawings are for illustrative purposes only and are not intended to in any way limit the scope of the invention as described in the appended claims.

Thus, there has been described herein an embodiment including at least one preferred embodiment of an embedded modem It will be apparent to those skilled in the art that the disclosed subject matter may be modified in numerous ways and may assume many embodiments other than the preferred form specifically set out and described above.

Accordingly, the above disclosed subject matter is to be considered illustrative and not restrictive, and to the maximum extent allowed by law, it is intended by the appended claims to cover all such modifications and other embodiments which fall within the true spirit and scope of the present invention. The scope of the invention is to be determined by the broadest permissible interpretation of the following claims and their equivalents rather than the foregoing detailed description.

We claim:

1. An embedded modem having a general purpose processor and a digital signal processor that are responsive to a plurality of programs stored in at least one memory module to handle a modulation and a transmission of signals to a communication link and a reception and a demodulation of signals from the communication link, wherein the general purpose processor is adapted to execute lengthy programs and the digital processing unit is adapted to execute concise programs such that the general purpose processor is arranged to perform a first stage of a modem handshaking process comprising substantially of control takes and the digital signal processor is arranged to perform a second stage of the modem handshaking process.

2. The embedded modem of claim 1 wherein the general purpose processor is adapted to determine which programs are to be executed by the digital signal processor.

3. The embedded modem of claim 2 wherein the general processor writes function descriptors that indicate which programs are to be executed by the digital signal processor, to order the digital signal processor to read the function descriptors, and to execute the programs indicated by the function descriptors.

4. The embedded modem of claim 3 wherein the digital signal processor notifies the general purpose processor when it ended the execution of the programs indicated by the function descriptors.

5. The embedded modem of claim 4 wherein each function descriptor comprises of a
   pointer field, that points to a location in an internal memory module in which a program to be executed by the digital signal processor is stored.

6. The embedded modem of claim 5 wherein each function descriptor further comprising of an END(j) field, indicating whether the function descriptor is a last function descriptor in a sequence of function descriptors, the sequence of function descriptors is to be read by the digital signal processor;
   a WRAP(j) field, indicating whether to read a first function descriptor of the sequence of function descriptors, after the last function descriptor is read.

7. The embedded modem of claim 6 herein each function descriptor further comprising of a plurality of PARAMETER(j,k) fields, for storing negotiating parameter.

8. The embedded modem of claim 3 further comprising:
   an internal memory module, coupled to the digital signal processor, for storing DSP programs;
   an external memory module, coupled to the digital signal processor and to the general purpose processor, for storing general purpose programs and for storing the function descriptors;
   a buffer means, coupled to the digital signal processor, to the general purpose processor and to an analog front end, for allowing information to be sent from the analog front end or to the analog front end;
   an analog front end; and
   a data access arrangement circuit, coupled to the analog front end and to a communication link.

9. The embedded modem of claim 8 wherein the buffer means further comprising;
   two receive buffers, coupled to the analog front end, to the general purpose processor and to the digital signal processor, for allowing the general purpose processor and the digital signal processor to process data that is stored in one receive buffer while receiving data from the analog front end in another receive buffer;
   two transmit buffers, coupled to the analog front end, to the general purpose processor and to the digital signal processor, for allowing the general purpose processor and the digital signal processor to process data that is stored in one transmit buffer before being sent to the analog front end, while transmitting data that is stored in another transmit data to the analog front end; and
   a buffer control unit, coupled to the two receive buffers, to the two transmit registers, to the general purpose processor and to the digital signal processor, for determining which receive buffer and which transmit buffer are to be coupled to the analog front end, and which receive buffer and transmit buffer are to be accessed by the digital signal processor and the general purpose processor.

10. The embedded modem of claim 2 wherein the general purpose processor is adapted to handle phases 1 and 2 of a modem handshaking process and a part of phases 3 and 4 of the handshaking process; and
    the digital signal processor is adapted to handle another part of phases 3 and 4 of the handshaking process and the exchange of information that follows a successful handshaking process.

11. The embedded modem of claim 10 wherein the general processor writes function
    descriptors that indicate which programs are to be executed by the digital signal processor, and to order the digital signal processor to read the function descriptors and to execute the programs indicated by the function descriptors.

12. The embedded modem of claim 11 wherein the digital signal processor notifies
    the general purpose processor when it ended the execution of the programs indicated by the function descriptors.

13. The embedded modem of claim 12 wherein each function descriptor comprises of
    a pointer field, that points to a location in an internal memory module in which a program to be executed by the digital signal processor is stored.

14. The embedded modem of claim 13 wherein each function descriptor further comprising of an END(j) field, indicating whether the function descriptor is a last function descriptor in a sequence of function descriptors, the sequence of function descriptors is to be read by the digital signal processor;
    a WRAP(j) field, indicating whether to read a first function descriptor of the sequence of function descriptors, after the last function descriptor is read.

15. The embedded modem of claim 14 wherein each function descriptor further comprising of a plurality of PARAMETER(j,k) fields, for storing negotiating parameter.

16. The embedded modem of claim 11 wherein the digital signal processor is controlled by a plurality of DSP programs that form a DSP control program, the plurality of DSP programs are referenced by the instructions that are written in the Instruction buffer.

17. The embedded modem of claim 16 wherein the plurality of DSP programs comprise of: a phase 3 and phase 4 modulator program; a phase 3 and phase 4 pulse shape filter program; a phase 3 and phase 4 pre-emphasis filter program; a phase 3 and phase 4 finite impulse response filter of an adaptive filter program; a phase 3 and phase 4 LMS block of the adaptive filter program; a phase 3 and phase 4 finite impulse response filter of an echo canceller program; a phase 3 and phase 4 LMS block of the echo canceller program, and a data mode program 68.

18. The embedded modem of claim 17 wherein the general purpose processor is controlled by a CPU control program, the CPU control program comprises of:
    dial call progress program; ring detector program; phase 1 handshaking program; phase 2 handshaking program; phase 3 and 4 echo canceller error calculation program; phase 3 and 4 adaptive filter error calculation program; and a link layer protocol program.

19. The embedded modem of claim 16 wherein the plurality of DSP programs are stored in an internal memory module, coupled to the digital signal processor.

20. An embedded modem having a general purpose processor and a digital signal
processor that are responsive to a plurality of programs stored in at least one memory module to handle a modulation and a transmission of signals to a communication link and a reception and a demodulation of signals from the communication link, wherein the general purpose processor is adapted to execute time consuming programs and control programs and the digital processing unit is adapted to execute digital signal processing programs such that the general purpose processor is arranged to perform a first stage of a modem handshaking process comprising substantially of control takes and the digital signal processor is arranged to perform a second stage of the modem handshaking process.

21. The embedded modem of claim 20 wherein the general purpose processor is adapted to determine which programs are to be executed by the digital signal processor.

22. The embedded modem of claim 21 wherein the general processor writes function descriptors that indicate which programs are to be executed by the digital signal processor, to order the digital signal processor to read the function descriptors, and to execute the programs indicated by the function descriptors.

23. The embedded modem of claim 22 wherein the digital signal processor notifies the general purpose processor when it ended the execution of the programs indicated by the function descriptors.

24. The embedded modem of claim 23 wherein each function descriptor comprises of a pointer field, that points to a location in an internal memory module in which a program to be executed by the digital signal processor is stored.

25. The embedded modem of claim 24 wherein each function descriptor further comprising of an END(j) field, indicating whether the function descriptor is a last function descriptor in a sequence of function descriptors, the sequence of function descriptors is to be read by the digital signal processor;
   a WRAP(j) field, indicating whether to read a first function descriptor of the sequence of function descriptors, after the last function descriptor is read.

26. The embedded modem of claim 25 wherein each function descriptor further comprising of a plurality of PARAMETER(j,k) fields, for storing negotiating parameter.

* * * * *